Sept. 9, 1952  E. D. MARKLE  2,609,737
CAMERA FOCUSING DEVICE
Filed March 29, 1949
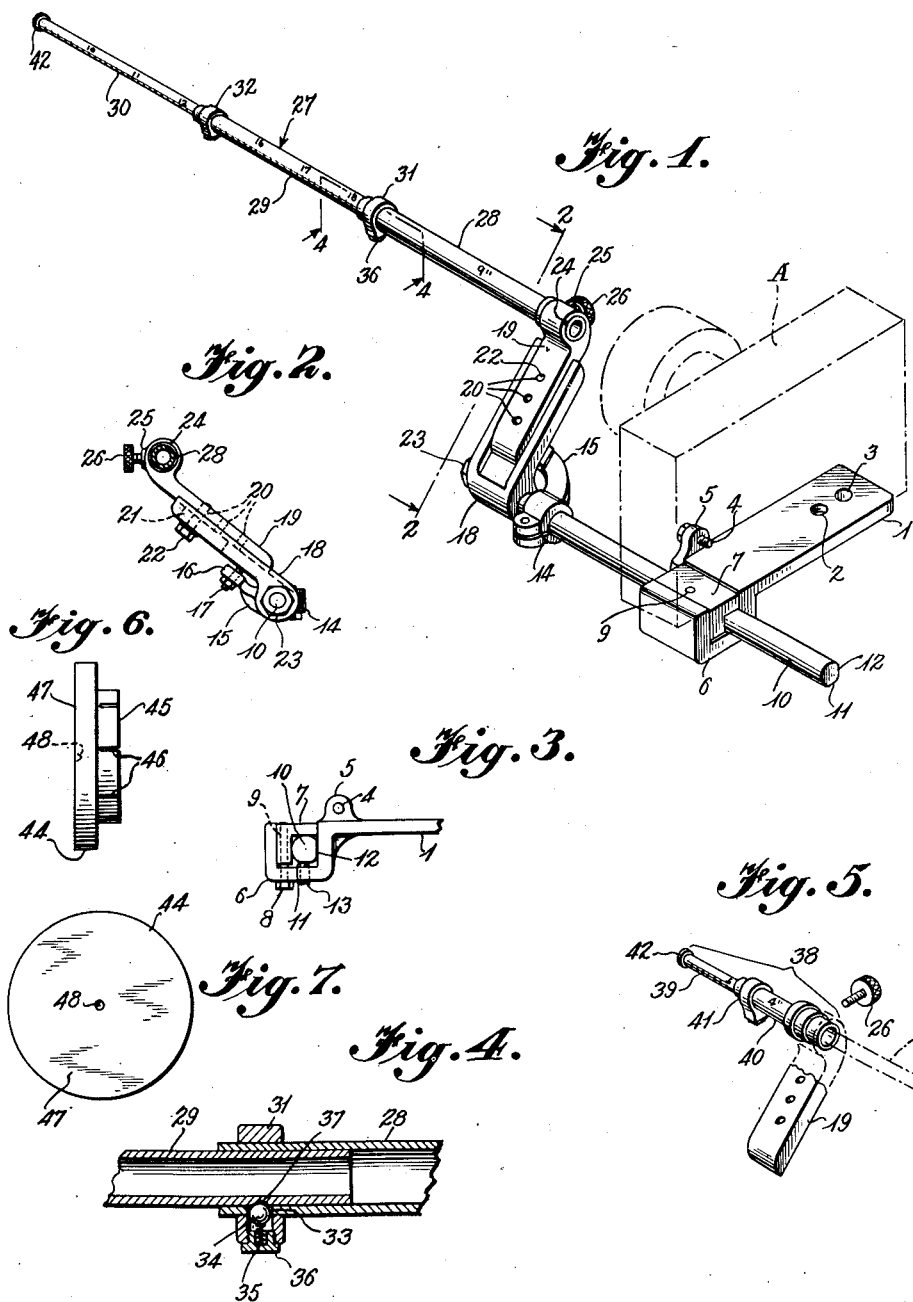
INVENTOR.
Edward D. Markle
BY
Burns Doane + Benedict
ATTORNEYS Patented Sept. 9, 1952

2,609,737

UNITED STATES PATENT OFFICE 2,609,737

CAMERA FOCUSING DEVICE

Edward D. Markle, Jefferson City, Mo.

Application March 29, 1949, Serial No. 84,061

6 Claims. (Cl. 95—11)

This invention relates to the art of photography. More particularly it relates to a camera focusing device whereby a conventional camera equipped with a positive auxiliary lens may readily be employed to photograph objects at extremely close range and especially in the field of clinical photography.

The lenses with which most conventional cameras are equipped cannot be focused unaided for a lens-to-subject distance of less than about four feet. For the production of photographs at closer range, such camera lenses must accordingly be supplemented with a positive auxiliary lens.

The function of such an auxiliary lens may be regarded as that of creating a virtual image at infinity. When the camera lens is focused for infinity, the subject will be in focus when at a distance from the supplementary lens approximately equal to the focal length of the supplementary lens. As the focal setting of the camera lens is reduced from infinity to the minimum setting available, usually about four to six feet, the lens-to-subject distance requisite to accurate focus is correspondingly reduced. It is important to note that it is the distance of the subject from the auxiliary lens rather than from the camera lens that is of significance.

The power of such auxiliary lenses is customarily expressed in terms of diopters and is designated by an arabic numeral followed by a plus (+) sign in the case of positive lenses. The symbol "3+" is accordingly indicative of a positive auxiliary lens of three diopters power. The power in diopters of a lens is the reciprocal of the focal length in meters. Thus, the focal length of a 3+ lens is approximately 13.1 inches, whereas the focal length of an 8+ lens is about 4.9 inches.

As the power of the auxiliary lens employed is increased, the field size which can be made to fill the film negative is decreased. It is thus theoretically possible to take accurate photographs of extremely small objects by the utilization of an auxiliary lens of adequately high power. Furthermore, the degree of magnification of the subject in the negative can be controlled by proper selection of auxiliary lenses and adjustment of operating distances.

Although it is possible by means of positive auxiliary lenses to adapt ordinary cameras to photograph small objects at close range, such a procedure has not heretofore been deemed practical as a consequence of the extremely shallow depth of focus which obtains.

The depth of focus is approximately inversely proportional to the square of the lens-to-subject distance. Hence, for extreme closeups, such as those dictated by the use of 5+ to 10+ auxiliary lenses, the depth of focus is a matter of mere fractions of an inch.

In the table are tabulated some representative data showing the approximate lens-to-subject distances (working distance), depth of focus, and camera field size which obtain for a 35 mm. camera equipped with a 50 mm. lens supplemented by 3+, 5+, 8+ and 10+ auxiliary lenses when focused at infinity with a lens aperture setting of $f/8$. All measurements are in inches.

Table

| Strength of Auxiliary Lens | Camera Subject Area Size | Auxiliary Lens-to-Subject Distance | Depth of Focus | | |
|---|---|---|---|---|---|
| | | | Near | Far | Total |
| 3+ | 6¼ x 9⅜ | 13 | ⅝ | ¾ | 1⅜ |
| 5+ | 3¾ x 5¾ | 7⅞ | ¼ | ¼ | ½ |
| 8+ | 2¼ x 3¼ | 5 | ⅛ | ⅛ | ¼ |
| 10+ | 1⅞ x 2¾ | 4 | | | ⅛ |

It is strikingly apparent from the foregoing table that an auxiliary lens of high diopter power is required to reduce the camera field to a size appropriate for the photographing of extremely small objects, for example, a tooth or infected area in the mouth of a dental patient.

It is also apparent from the table that, as a consequence of the use of auxiliary lenses of such high power, the depth of focus is so reduced that the production of photographs in which the subject is sharply in focus requires accurate, precise determination of proper lens-to-subject distance. Because of the presence of the auxiliary lenses and the required proximity of the camera to the subject to be photographed, neither the range finder, the ordinary view finder, nor the focusing scale of the camera can be used.

The production of accurate pictures of small objects at close range with a conventional camera is a particularly acute problem in the field of clinical photography where it is frequently necessary to produce technically acceptable photographs of small and often difficultly accessible portions of the body such as organs revealed by surgical incisions or contained in body cavities such as the mouth.

The primary object of this invention is to provide an apparatus whereby a conventional camera equipped with an auxiliary lens of desired diopter strength may be easily and practically employed to produce technically acceptable photographs of objects at extremely close range.

The details of the invention will be apparent from the description hereinafter and from the drawings in which:

Fig. 1 is a view in perspective illustrating the device of the present invention;

Fig. 2 is a detailed view with parts shown in section taken in the direction of the arrows on line 2—2 of Figure 1;

Fig. 3 is a fragmentary detailed view showing a portion of the rear of the device;

Fig. 4 is a detailed cross-sectional view in the direction of the arrows on the line 4—4 of Fig. 1;

Fig. 5 is a detailed view in perspective of a further adaptation of the invention;

Fig. 6 is a side elevation view of a disc attachment for use in adjusting the device; and Fig. 7 is a front elevation view thereof.

Referring to the drawings, the base bracket 1 is provided with a vertical opening 2 for the reception of a tripod or like fitting (not shown) on which the base bracket 1 may be stationarily supported. The base bracket 1 is provided with a second vertical opening 3 adapted to receive a suitable screw (not shown) which in its upward position can be threadedly inserted into the threaded opening conventionally provided in the base of a camera. A camera is diagrammatically illustrated at "A" in the position that it is adapted to occupy when mounted upon the base bracket 1. It will be appreciated that the camera "A" will have limited pivotal movement about the attaching screw extending through the opening 3. Adjusting screw 4 threadedly carried by the ear 5 of the bracket 1 is provided to permit accurate adjustment of the angular movement of the camera "A" on the bracket 1 about the axis of the opening 3.

Bracket 1 is provided at one end with a downwardly extending U-shaped portion 6. The U-shaped portion 6 slidably receives therein an angular clamping block 7 which is movable from clamping to releasing position, and vice versa, by the bolt 8 (see Figure 3) extending through the bottom of the U-shaped portion of the bracket 1 and threadedly received in the opening 9 of the angular block 7. Adjustably secured in the U-shaped portion 6 of the bracket 1 is a main supporting bar 10 for the focal pointer of the device. The bar 10 for a portion of its length is flattened on two sides as indicated at 11 and 12. The flattened face 11 is adapted to lie toward the bottom of the channel provided by the U-shaped portion 6 of the bracket 1 and the flattened face 12 is adapted to lie against the inner wall of such U-shaped portion. The angular clamp block 7 thus acts to hold the bar 10 in non-rotating position within the U-shaped portion 6 of the bracket 1. To further insure against either longitudinal or rotational movement of the bar 10 beneath the clamp block 7, there is additionally provided a set screw 13 as shown in Fig. 3 which when tightened from the underside of the bracket 1 will engage and bite into the flattened face 11 of the bar 10.

A split clamp 14 is adapted to be passed over the free end of the bar 10 and held in any desired position of angular adjustment about the bar 10 by the clamping screw 15 (see Figure 2) which may be tightened to lock the split clamp on the bar 10 or released to permit adjustment thereof along and about the bar 10. The split clamp 14 is provided with a curved arm 15 terminating in a screw threaded circular end portion 16 (see Figure 2) for receiving an adjusting screw 17.

There is also passed over the front or free end of the bar 10 one arm 18 of an extensible bracket embracing the arm 18 pivotally mounted on bar 10 and a second arm 19. The arm 19 is provided with a series of apertures indicated generally at 20, any one of which may be brought into registry with the slot 21 in arm 18 (see Figure 2) through which the screw 22 is adapted to extend for interlocking arms 18 and 19 to provide an extensible two part bracket of any desired length. It will be appreciated that other means for obtaining variation in the overall length of the supporting bracket embracing arms 18 and 19 may be provided.

The front or free end of the bar 10 is threaded and receives holding nut 23 which maintains the bracket arm 18 in position on the bar 10. It will be appreciated that the two part bracket comprising the bars 18 and 19 is free to pivot about the bar 10 as an axis, limited only in its pivotal movement by contact with the adjustable screw 17 carried by the arm 15 of the split bracket 14.

The free end of the arm 19 is provided with an opening 24 and a threaded boss 25 (see Figure 2) into which the knurled head clamping screw 26 extends. The telescopic focal pointer is indicated generally at 27 and embraces the three telescoping sections 28, 29 and 30. Section 28 is the larger of the three and has one end thereof generally secured by the clamping screw 26 in the opening 24.

In the illustrated embodiment of the invention the telescopic sections 28, 29 and 30 are tubular, and the intermediate section 29 is adapted to be telescopically received within the larger section 28, whereas the end section 30 is adapted to be telescopically received in the intermediate section 29.

The illustrated means for holding the telescopic sections 29 and 30 against accidental disassembly take the form of collars 31 and 32. One of these collars, namely, the collar 31, is shown in detail in the sectional view in Figure 4. The collar 31 is fixedly held on the tubular member 28, the outer wall of which is apertured at 33 to receive the ball 34 resiliently pressed into engagement with the wall of the telescopic member 29 by a small coil spring 35 held in position by a cap screw 36 threadedly received in the lower portion of the collar 31. It will be appreciated that the ball 34 exerts frictional force against the telescopic section 29 at all positions of adjustment of the section 29 with respect to the larger section 28. The wall of the section 29 is recessed as indicated at 37 in such a way that when the recess 37, which may constitute a groove around the member 29, coincides with the ball 34 outward movement of the section 29 with respect to the section 28 will be effectively resisted, thus obviating accidental disassembly. The same detent arrangement exists between sections 29 and 30.

A further adaptation is shown in Figure 5, wherein a telescopic focal pointer indicated generally at 38 embraces only the two sections 39 and 40, which are of a length particularly adapted for extremely close work. The collar 41 may be of the same general character as the collar 31 above described.

The outermost section of either focal pointer may be provided with a removable sterile contact ball 42, which is particularly desirable when the device is employed for clinical photography, since in such work the free end of the focal pointer may be inserted into a body cavity and into direct contact with a portion thereof.

As indicated, the focal pointers are suitably calibrated to indicate the distance from the auxiliary lens to the subject.

My device is capable of being used with cameras of various types. Such cameras vary considerably in their dimensions and configuration. Some means must be provided for adjusting the apparatus to accurately position the focal pointer so that it coincides with the optical axis of the lens. The section 39 of the focal pointer illustrated in Fig. 5 can be retracted to the dotted line position shown in that figure in which position the contact ball 42 abuts the forward end of the section 40. The rearward end of the section 39 is pointed, as indicated at 43. The auxiliary lens may be removed from the camera A and replaced by the disc attachment 44 illustrated in Figs. 6 and 7. This disc attachment is provided with an annular flange 45 having slots 46 therein to provide resiliency to the flange. The disc attachment 44 may thus be attached to the conventional camera lens in the same manner as the auxiliary lens.

The disc attachment 44 has a plane front face 47 provided with an indentation 48 in its exact center. The dimensions of the disc attachment 44 are such that when it is positioned on the camera the bottom of the indentation 48 is the same distance from the conventional lens of the camera as the exact center of the outer surface of the auxiliary lens will be when that lens is placed on the camera. The disc attachment 44 is placed on the camera and the apparatus is adjusted so that the point 43 of the section 39 is positioned within the indentation 48. The various adjustments are then secured in this position and the focal pointer then exactly coincides with the optical axis of the lens, and the section 40 is appropriately spaced the proper distance in front of the camera. The section 39 can then be moved to its full line position illustrated in Fig. 5 and the apparatus may then be used for short lens-to-subject distances. For longer lens-to-subject distances the sections 39 and 40 may be withdrawn from the aperture in the arm 19 and the focal pointer illustrated in Fig. 1 may be substituted.

It will not be necessary to use the disc attachment 44 after an initial adjustment has been made. Once the apparatus has been adjusted for a particular camera the adjustment can be maintained. However, readjustment will be necessary if the camera is changed or if the adjustment is lost in any other manner. I consider it advisable to check the adjustment from time to time to insure accuracy.

In operation, the lens focusing adjustment of the camera A is set to obtain, within the possible limits, the desired camera field size, degree of magnification of the subject, and working distance. The longitudinal axis of focal pointer 27 is aligned by adjustment of the extensible bracket comprising the bar 10, the arms 18 and 19, the split clamp 14, and adjusting screws 4 and 17 with respect to the optical axis of the camera A.

Focal pointer 27 is then extended by means of telescoping units 28, 29 and 30 to the predetermined proper working distance between the particular auxiliary lens of the camera A and the subject to be photographed.

Contact ball 42, which may be sterilized if desired, is then placed in contact with the subject to be photographed, thus automatically positioning the camera A the proper working distance therefrom and with its lens in direct alignment therewith. The camera A is rigidly secured in this position by conventional means, such as a tripod, not shown in the drawings.

After the camera is secured in the proper position with respect to the subject to be photographed, the focal pointer is partially or completely telescoped and moved out of the objective field of camera A by rotation of the two part bracket embracing arms 18 and 19 about the bar 10. The picture is then taken.

It will be appreciated that the features of the invention whereby the focal pointer may be positioned in axial alignment with the lens and may be reduced in length prior to rotation out of the camera field are of particular significance in the field of clinical photography wherein the subjects photographed are frequently contained in body cavities or surgical incisions.

While the focal pointer 27 is disclosed as carried by the base bracket I by means of a screw engaged in the tripod socket of the camera, it is to be understood that other supporting means may be provided whereby the focal pointer may be brought into proper operative relationship with the camera lens and are within the scope of the invention.

Likewise the focal pointer of the invention need not be limited to true telescopic construction in the sense that each extensible element thereof is collapsible into the next preceding element as indicated in the drawings. It is only required that the focal pointer be infinitely adjustable throughout its extensible length.

Furthermore, the invention is not limited to focal pointers having two telescopic units as shown in Figure 5 or three telescopic units as shown in Figure 1. Focal pointers having any desired number of extensible units of any desired cross-sectional design, such as polygonal, ovate or ellipsoidal may be employed. In view of the fact, however, that the apparatus of this invention is designed for photography at a lens-to-subject distance of less than about four feet, a focal pointer of three telescopic or similar units is generally adequate. When it is necessary to operate at extremely short lens-to-subject distances such as those dictated by the use of auxiliary lenses of from 5 to 10 diopters in power, a focal pointer comprised of only two such units is preferable. Figure 5 is illustrative of such a two unit focal pointer, which, for example, might be seven inches in length when fully extended and four inches in length when completely telescoped. A three telescopic unit focal pointer such as that illustrated in Figure 1 may preferably be so constructed as to be adjustable in length over a range of from about 9 to about 21 inches. Such a focal pointer would result for example by constructing the unit 28 of eight inches in operative length, the central telescopic unit 29 extensible seven inches therefrom, and the telescopic unit 30 including ball point 42 extensible six inches from the central telescopic unit 29. A third telescoping focal pointer may be provided for use when the work is to be done at lens-to-subject distances of from seven to nine inches.

The focusing device of this invention may, of course, be manufactured from any material having the requisite physical characteristics. Thus metals such as steel, iron, aluminum, magnesium, silver and the like, and alloys thereof with such other metals as copper, tungsten, vanadium, zinc, silver, and the like may be employed. Likewise plastic materials such as many of the various polyvinyl resins, polymethacrylate resins, copolymeric resins, urea formaldehyde reins, phenolic resins such as those derived from phenol and formaldehyde, and similar materials may be utilized. Wood, such as hickory, oak, or ash may be employed. In practice the apparatus will perhaps be constructed from a combination of the above mentioned materials.

The proper working distances for cameras equipped with positive auxiliary lenses are determinable by calculation. However, such data constitute the subject matter of tables printed for the benefit of photographers. See, for example, "Radiography and Clinical Photography," vol. 2, No. 2, pages 46 and 47.

As illustrative of the invention there is provided the following description of the use thereof in conjunction with a 35 mm. camera equipped with a 50 mm. lens to photograph a portion of the interior of the mouth of a dental patient. The aperture of the lens of the camera is set at f/8, focused for infinity and equipped with a 6+ auxiliary lens.

The focal pointer 38 is placed in operative position and extended so that the sterilized ball 42 is located at the proper working distance of 6¾ inches in front of the auxiliary lens and at a point lying on the optical axis thereof. The sterilized ball point 42 is then placed in contact with the portion of the mouth it is desired to photograph, thus automatically placing the camera in proper focal relation with respect thereto. The camera is then secured in this position, the focal pointer is collapsed and moved out of the objective field of the camera and the picture is taken.

The two telescopic embodiment of the focal pointer shown generally at 38 (Fig. 5) was utilized in the foregoing description as a consequence of the extremely short working distance dictated by the 6+ auxiliary lens.

Although the focusing device of this invention has been above specifically described as useful in conjunction with a 35 mm. camera equipped with a 50 mm. lens, it is operable with other types of cameras having any of the various possible sizes of lens. For example, the invention may be employed with folding or box cameras equipped with 75 mm., 100 mm., 127 mm., 135 mm., 150 mm., or other larger or smaller size lenses supplemented with any desired positive auxiliary lenses. Furthermore, cameras having lens diaphragms of any desired aperture such as f/64, f/32, f/16, f/8, f/6.3, f/4.5, f/2, f/1.5, are suitable for use with the invention.

Furthermore, the invention is useful not only with still cameras, such as those above-mentioned, but is equally useful in conjunction with motion picture cameras, for example, 16 mm. cameras having a 25 mm. lens, or 8 mm. cameras having a 12½ mm. lens.

The focusing device of this invention inexpensively and simply provides, with positive mechanical accuracy, the proper lens-to-subject focusing distance while insuring against undesirable shadows, thus insuring excellent closeup, portrait and magnification photography with an ordinary camera equipped with a positive auxiliary lens. Such photography was heretofore deemed feasible only with expensive specially constructed cameras and complex apparatus. This invention accordingly constitutes a significant advance in the art and for the first time makes it possible for every individual interested to engage in this aspect of photography.

I have illustrated and described what I now consider to be the preferred embodiment of my invention. However, it is to be understood that various alterations and modifications may be resorted to without departing from the scope of my invention as defined by the following claims.

I claim:

1. Apparatus for close range clinical photography comprising a camera, a positive auxiliary lens on said camera, a camera focusing device comprising a supporting base releasably attached to said camera, a bar extending forwardly from and adjustably carried by said base, a bracket of adjustable length having one end pivotally mounted on said bar, a focal pointer of adjustable length secured to the free end of said bracket and extending forwardly therefrom, a member removably attachable to said camera and having a portion thereof coinciding with the optical axis of said camera, adjustable stop means for holding said bracket in relation to said bar to permit the rearward end of said focal pointer to engage said portion of said member in such manner that the longitudinal axis of said focal pointer will coincide with the optical axis of said camera, said bracket and said focal pointer carried thereby being free to move as a unit about said pivotal mounting to a position out of the objective field of said camera.

2. Apparatus for close range clinical photography comprising a camera, a positive auxiliary lens on said camera, a camera focusing device comprising a supporting base releasably attached to said camera, a bar extending forwardly from and adjustably attached to said base, a bracket of adjustable length having one end pivotally mounted on said bar, a telescopic focal pointer secured to the free end of said bracket and extending forwardly therefrom, a member removably attachable to said camera and having a portion thereof coinciding with the optical axis of said camera, adjustable stop means for holding said bracket in relation to said bar to permit the rearward end of said focal pointer to engage said portion of said member in such manner that the longitudinal axis of said focal pointer will coincide with the optical axis of said camera, the said bracket and said focal pointer carried thereby being free to move as a unit about said pivotal mounting to a position out of the objective field of the camera, said focal pointer being calibrated to indicate the total length thereof in any degree of extension and being equipped with means whereby it may be held in any desired degree of extension.

3. A camera focusing device comprising a supporting base for a camera, a bar extending forwardly from and adjustably attached to said base, a bracket of adjustable length having one end pivotally mounted on said bar, a telescopic focal pointer secured to the free end of said bracket and extending forwardly therefrom, a ball point attached to the distal aspect of said focal pointer, a member removably attachable to said camera and having a portion thereof coinciding with the optical axis of said camera, adjustable stop means for holding said bracket in relation to said bar to permit the rearward end of said focal pointer to engage said portion of said member in such manner that the longitudinal axis of said focal pointer will coincide with the optical axis of a camera mounted on said base, said bracket and said focal pointer carried thereby being free to move as a unit to a position out of the objective field of the camera, said focal pointer being calibrated to indicate the total length thereof in any degree of extentension and being equipped with means whereby it may be held in any desired degree of extension.

4. A camera focusing device comprising a supporting base for a camera, a horizontal camera alignment means attached to said base, a bar adjustably attached to said base and extending forwardly therefrom outside the objective field of a camera mounted on said base, a bracket of adjustable length having one end pivotally mounted on said arm, a telescopic focal pointer secured to the free end of said bracket and extending forwardly therefrom, a member removably attachable to said camera and having a portion thereof coinciding with the optical axis of said camera, adjustable stop means for holding said bracket in relation to said bar to permit the rearward end of said focal pointer to engage said portion of said member in such manner that the longitudinal axis of said focal pointer will coincide with the optical axis of a camera mounted on said base, said bracket and focal pointer carried thereby being free to move as a unit to a position out of the objective field of said camera.

5. A camera focusing device comprising: a supporting base for a camera, a bar extending forwardly from said base, a bracket of adjustable length having one end pivotally mounted on said bar, a focal pointer secured to the free end of said bracket and extending forwardly therefrom, a member removably attachable to said camera and having a portion thereof coinciding with the optical axis of said camera, adjustable stop means for holding said bracket in relation to said bar to permit the rearward end of said focal pointer to engage said portion of said member in such manner that the longitudinal axis of said focal pointer coincides with the optical axis of a camera mounted on said base, said bracket and said focal pointer carried thereby being free to move as a unit to a position out of the objective field of said camera.

6. In combination, a camera, a supporting base adjustably attached to said camera, a bar adjustably secured to said base and extending forwardly therefrom in parallel relation to the optical axis of said camera and positioned outside the objective field of the camera, a bracket of adjustable length pivotally mounted on said bar for swinging movement in a plane perpendicular to the optical axis of the camera, a focal pointer carried by the free end of said bracket in parallel relation to said bar, said focal pointer being movable longitudinally and being provided with a point at one end, a member removably attachable to said camera and having a depression therein coinciding with the optical axis of said camera for receiving the pointed end of said focal pointer to position said focal pointer in exact alignment with the optical axis of the camera, and adjustable stop means operative to hold said bracket in position to retain said focal pointer in alignment with such optical axis and to permit said bracket and focal pointer to pivotally move out of the objective field of the camera.

EDWARD D. MARKLE.

REFERENCES CITED

The following references are of record in the file of this patent:

UNITED STATES PATENTS

| Number | Name | Date |
| --- | --- | --- |
| 1,239,145 | Wantz | Sept. 4, 1917 |
| 1,750,370 | Strauss | Mar. 11, 1930 |
| 1,753,151 | Israel | Apr. 1, 1930 |
| 2,107,074 | Hineline | Feb. 1, 1938 |
| 2,217,308 | Cox | Oct. 8, 1940 |
| 2,239,379 | Bucky | Apr. 22, 1941 |
| 2,244,409 | Upton | June 3, 1941 |
| 2,483,482 | Strobel | Oct. 4, 1949 |
| 2,537,303 | Cobb, Jr., et al. | Jan. 9, 1951 |
| 2,539,324 | Pollock | Jan. 23, 1951 |
| 2,551,703 | Puls | May 8, 1951 |

FOREIGN PATENTS

| Number | Country | Date |
| --- | --- | --- |
| 423,746 | Germany | Jan. 8, 1926 |